United States Patent [19]

Holroyd et al.

[11] Patent Number: 5,004,985

[45] Date of Patent: Apr. 2, 1991

[54] METHOD AND APPARATUS FOR TESTING THE RESPONSE OF A STRESS WAVE SENSOR

[75] Inventors: Trevor J. Holroyd; Timothy E. Tracey, both of Derby, England

[73] Assignee: Stresswave Technology Limited, Derby, England

[21] Appl. No.: 493,708

[22] Filed: Mar. 15, 1990

[30] Foreign Application Priority Data

Apr. 21, 1989 [GB] United Kingdom ............... 8909155

[51] Int. Cl.$^5$ ............................................. G01R 29/22
[52] U.S. Cl. ................................. 324/727; 73/1 DV; 324/603; 324/605; 324/537
[58] Field of Search ............. 324/537, 527, 602, 605, 324/612, 727, 71.1, 603; 73/1 DV, 1 R

[56] References Cited

U.S. PATENT DOCUMENTS

| | | | |
|---|---|---|---|
| 4,267,505 | 5/1981 | Biglin | 324/537 |
| 4,284,946 | 3/1981 | Sharron | 324/727 |
| 4,559,826 | 12/1985 | Nelson | 73/1 DV X |
| 4,609,994 | 1/1984 | Bassim et al. | 364/551 |
| 4,624,127 | 11/1986 | Narushima et al. | 73/1 DV |
| 4,785,232 | 11/1988 | Ballato et al. | 324/727 |
| 4,816,743 | 3/1989 | Harms et al. | 324/727 |

FOREIGN PATENT DOCUMENTS

| | | |
|---|---|---|
| 490635 | 10/1937 | United Kingdom . |
| 1369435 | 10/1970 | United Kingdom . |
| 1322390 | 12/1970 | United Kingdom . |
| 2142086 | 6/1983 | United Kingdom . |
| 2190508 | 9/1986 | United Kingdom . |

OTHER PUBLICATIONS

"Acoustic Emission", by Jack Spanner, 12/1973, pp. 240-245.

Primary Examiner—Kenneth Wieder
Assistant Examiner—Robert W. Mueller
Attorney, Agent, or Firm—Cushman, Darby & Cushman

[57] ABSTRACT

The invention relates to a method and apparatus for testing the response of a stress wave sensor to confirm that the transducer and amplifier are functioning satisfactorily.

A pulser is connected to the stress wave sensor at a point between the transducer and the amplifier. The pulser supplies a first and a second electrical pulse in series to the stress wave sensor. The first electrical pulse has a large amplitude such that it causes an operative transducer to oscillate and produce an additional electrical pulse. The first electrical pulse and the additional electrical pulse are supplied to the amplifier. An operative amplifier amplifies the first electrical pulse and any additional pulse to give an output signal, the output signal indicates if either the transducer or amplifier are not operating satisfactorily, the lack of an output signal indicates the amplifier is inoperative.

The second electrical pulse has a predetermined amplitude and is supplied to the amplifier, and is amplified by an operative amplifier to give a measure of the gain of the amplifier.

14 Claims, 3 Drawing Sheets

METHOD AND APPARATUS FOR TESTING THE RESPONSE OF A STRESS WAVE SENSOR

The present invention relates to a method and an apparatus for testing the response of a stress wave sensor or acoustic emission system.

Stress wave sensors are used for monitoring of machinery, processes or structures, and it is desirable for stress wave sensors to be installed for long term monitoring of machinery, processes or structures. In such long term monitoring of machinery, processes or structures, it is highly desirable to have a procedure to confirm that the stress wave sensor is working satisfactorily. It is necessary to confirm that the stress wave transducer and amplifier which make up part of the stress wave sensor are functioning satisfactorily.

Common methods used to confirm the operation of acoustic emission sensors are the use of a breaking pencil lead, a gas jet, or a periodically applied stress wave pulse from another electrically excited acoustic emission transducer. However such methods require an operator to check the acoustic emission sensor is working satisfactorily.

The present invention seeks to provide a novel method and apparatus for testing the response of a stress wave sensor.

Accordingly the present invention provides a method of testing the response of a stress wave sensor, the stress wave sensor comprising a transducer and an amplifier arranged electrically in series, the method comprising supplying to the sensor at a point electrically between the transducer and the amplifier at least one first electrical pulse, the first electrical pulse being of a relatively large amplitude such that it causes an operative transducer to oscillate, an operative transducer caused to oscillate by the at least one first electrical pulse generating an additional electrical pulse, supplying first electrical pulse and any additional electrical pulse generated by the transducer to the amplifier, an operative amplifier amplifying the supplied first electrical pulse and any additional electrical pulse to produce an output signal, determining from the output signal of the amplifier if any one or more of the transducer and amplifier are not operating satisfactorily, an inoperative amplifier not amplifying the supplied first electrical pulse and any additional electrical pulse and not producing an output signal, the lack of an output signal from the amplifier ,indicating that the amplifier is inoperative, supplying a second electrical pulse to the sensor at the point electrically between the transducer and the amplifier, the second electrical pulse being of relatively small predetermined amplitude such that it does not saturate the amplifier, supplying the second electrical pulse to the amplifier and determining from the output signal of the amplifier corresponding to the second electrical pulse the gain of the amplifier.

Accordingly the present invention also provides an apparatus for testing the response of a stress wave sensor, the stress wave sensor comprising a transducer and an amplifier arranged electrically in series, the apparatus comprising a pulser arranged to be electrically connected to the stress wave sensor at a point electrically between the transducer and the amplifier, the pulser being arranged to supply at least one electrical pulse to the stress wave sensor, the supplied electrical pulse being of relatively large amplitude such that it causes an operative transducer to oscillate, an operative transducer caused to oscillate by the at least one first electrical pulse generating an additional electrical pulse, the supplied electrical pulse and any additional electrical pulse generated by the transducer being supplied to the amplifier, an operative amplifier amplifying the supplied electrical pulse and the additional electrical pulse to produce an output signal, means to determine from the output signal of the amplifier if any one or more of the transducer and amplifier are not operating satisfactorily, an inoperative amplifier not amplifying the supplied electrical pulse and any additional electrical pulse and not producing an output signal, the lack of an output signal from the amplifier indicating that the amplifier is inoperative, the pulser is arranged to supply at least one second electrical pulse to the stress wave sensor, the second electrical pulse being of relatively small predetermined amplitude such that it does not saturate the amplifier, the second electrical pulse being supplied to the amplifier and means to determine from the output signal of the amplifier corresponding to the second electrical pulse the gain of the amplifier.

The pulser may comprise a square wave generator arranged to supply a square wave signal to a first transistor, the first transistor being switched on when the input square wave is relatively high, the first transistor being electrically connected to a supply voltage, the first transistor being electrically connected in series to a second transistor via a capacitor, the second transistor being electrically connected to the supply voltage, the second transistor being switched on when the first transistor is switched on to produce the first electrical pulse, the first electrical pulse being supplied from the second transistor to the stress wave sensor, the capacitor being charged up to switch off the second transistor.

The first transistor may be switched off when the input square wave is relatively low, the first transistor producing the second electrical pulse which is supplied to the stress wave sensor via a second capacitor, a diode being arranged to set the predetermined amplitude of the second electrical pulse.

The present invention will be more fully described by way of example with reference to the accompanying drawings, in which.

Figure 1:
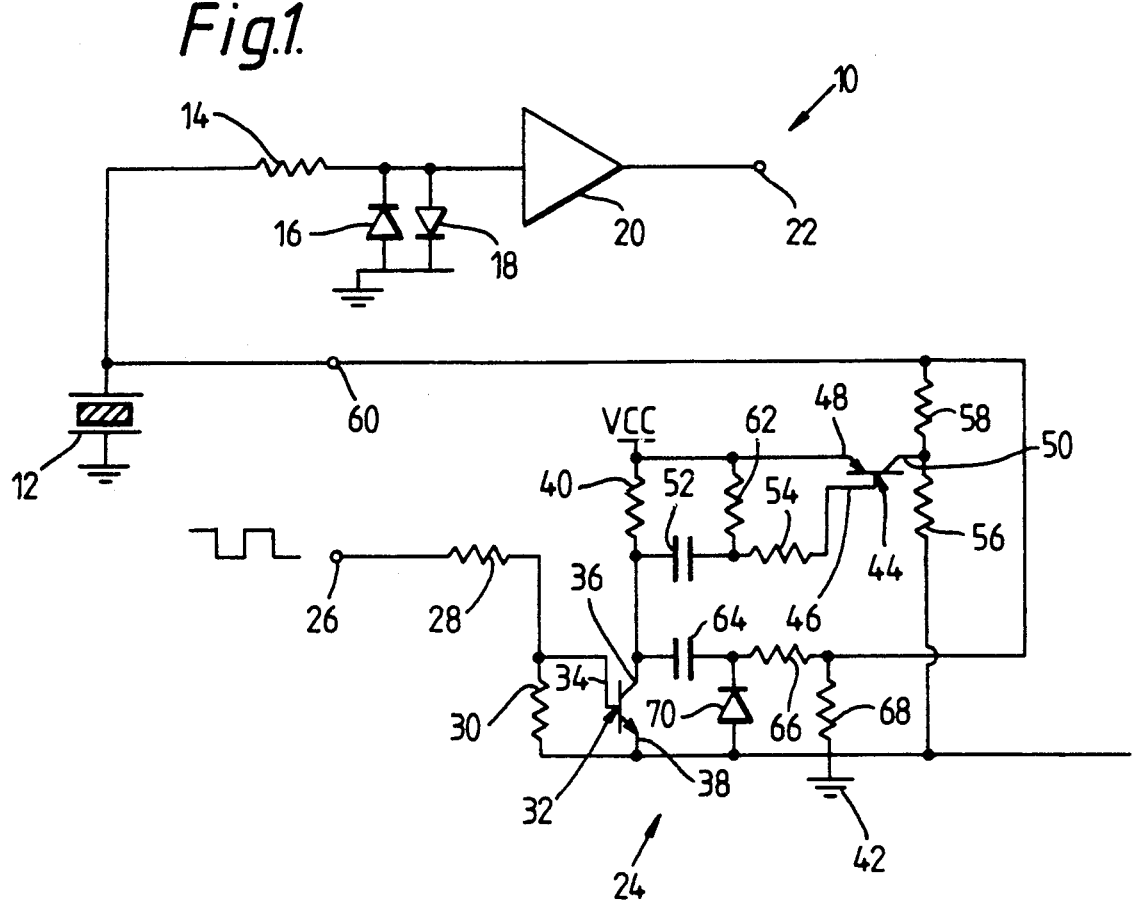
FIG. 1 is an electrical circuit representative of a stress wave sensor according to the present invention.

An apparatus 24 for testing the response of a stress wave sensor 10 is shown in FIG. 1. The stress wave sensor 10 comprises a piezoelectric type stress wave transducer 12 and an amplifier 20, electrically connected in series. A resistor 14 is positioned electrically in series between the transducer 12 and the amplifier 20 and diodes 16,18 are connected in parallel between the input to the transducer and earth to protect the amplifier 20. The amplifier 20 has an output terminal 22 which may be connected to further electronic circuitry, for example filters, processors, displays. In this example the amplifier 20 is connected to processors which rectify and envelope the amplifier output signal.

The apparatus 24 for testing the response of the stress wave sensor 10 comprises a pulser circuit which converts an input square wave into a series of output pulses. The pulser circuit is arranged to produce a first electrical pulse which has a relatively large amplitude, and a second electrical pulse which has a relatively small amplitude. The pulser circuit 24 comprises an input terminal 26 which is arranged to be supplied with a square wave electrical signal. A five volt square wave generator is suitable for this purpose. The pulser circuit 24 also comprises a supply voltage VCC.

The first relatively large electrical pulse occurs when the input square wave electrical signal goes high, this signal is supplied to the base terminal 34 of an NPN transistor 32, via a resistor 28, causing the transistor 32 to be switched on. The collector terminal 36 of the transistor 32 is connected to the supply voltage VCC via a resistor 40, the emitter terminal 38 of the transistor 32 is connected to earth 42 directly and the base terminal 34 of the transistor 32 is also connected to earth 42 via a resistor 30. When transistor 32 switches on, the voltage on its collector terminal 36 drops rapidly from the supply voltage VCC potential.

The collector terminal 36 of the transistor 32 is connected to the base terminal 46 of a PNP transistor 44 via a capacitor 52 and a resistor 54 arranged in series. The emitter terminal 48 of the transistor 44 is connected to the supply voltage VCC and the collector terminal 50 of the transistor 44 is connected to a position between resistors 56 and 58 which form a voltage divider. Resistor 56 is connected to earth 42 and resistor 50 is connected to an output terminal 60 of the pulser circuit 24. When the voltage on the collector terminal 36 of transistor 32 drops, the voltage on the side of the capacitor 52 remote from transistor 32 is initially pulled down causing the transistor 44 to be switched on, this produces a positive first electrical pulse which is supplied to the output terminal 60. The amplitude of the first electrical pulse is almost equal to the supply voltage VCC. The capacitor 52 then charges up through a resistor 62 causing the transistor 44 to be switched off and the first electrical pulse to be terminated.

The second relatively small electrical pulse occurs when the input square wave electrical signal goes low, this signal is again supplied to the base terminal 34 of the NPN transistor 32, causing the transistor 32 to be switched off. The collector terminal 36 of the transistor 32 is connected to the output terminal 60 via a capacitor 64 and a resistor 66 arranged electrically in series. The resistor 66 and a resistor 68 are arranged to form a voltage divider, the resistor 68 also being connected to earth 42. When transistor 32 switches off, the voltage on its collector terminal 36 rises to the supply voltage VCC potential. This causes the side of the capacitor 64 remote from transistor 32 to rise to 5.6 volts, which is set by a Zener diode 70 connected to a position between the resistor 66 and the capacitor 64 and the earth 42. The voltage divider formed by the resistors 66 and 68 supplies a second electrical pulse with a voltage considerably smaller, for example 100 times, than 5.6 volts to the output terminal 60. The capacitor 36 then discharges through resistors 66 and 68 causing the voltage across the diode 70 and therefore the voltage supplied to the output terminal 60 to fall.

Thus the pulser circuit 24 continuously supplies alternate first and second electrical pulses to the output terminal 60 for as long a period as a square wave input is supplied to input terminal 26.

The pulser circuit 24 is connected to the stress wave sensor 10 such that the output terminal 60 of the pulser circuit 24 is electrically connected to the stress wave sensor 10 at a point electrically between the transducer 12 and the amplifier 20. The pulser circuit 24 supplies alternate first and second electrical pulses to the stress wave sensor 10 to test the response of the stress wave sensor 10.

The first electrical pulse, of relatively large amplitude, is supplied to the stress wave sensor 10 and is thus supplied to both the transducer 12 and the amplifier 20. The first electrical pulse excites the transducer 12 causing an operative transducer 12 to oscillate and to regenerate an additional electrical signal which is supplied to the amplifier 20. The first electrical pulse is amplified by the amplifier 20, and because the first electrical pulse is of relatively large amplitude the output from amplifier 20 at output terminal 22 corresponding to the first electrical pulse will be of relatively high level or magnitude. The additional electrical signal supplied from the operative transducer 12 is also amplified by the amplifier 20. Because of conversion losses in the transducer 12 as the first electrical pulse changes from electrical to mechanical oscillation and back from mechanical oscillation to an electrical signal the amplified additional electrical signal is at a much lower level than the direct first electrical pulse. The amplifier 20 is arranged to be sufficiently sensitive to detect the additional electrical signal and consequently the first electrical pulse is of such a magnitude that it electrically saturates the amplifier 20 i.e. the amplified signal is clipped.

Figure 2:
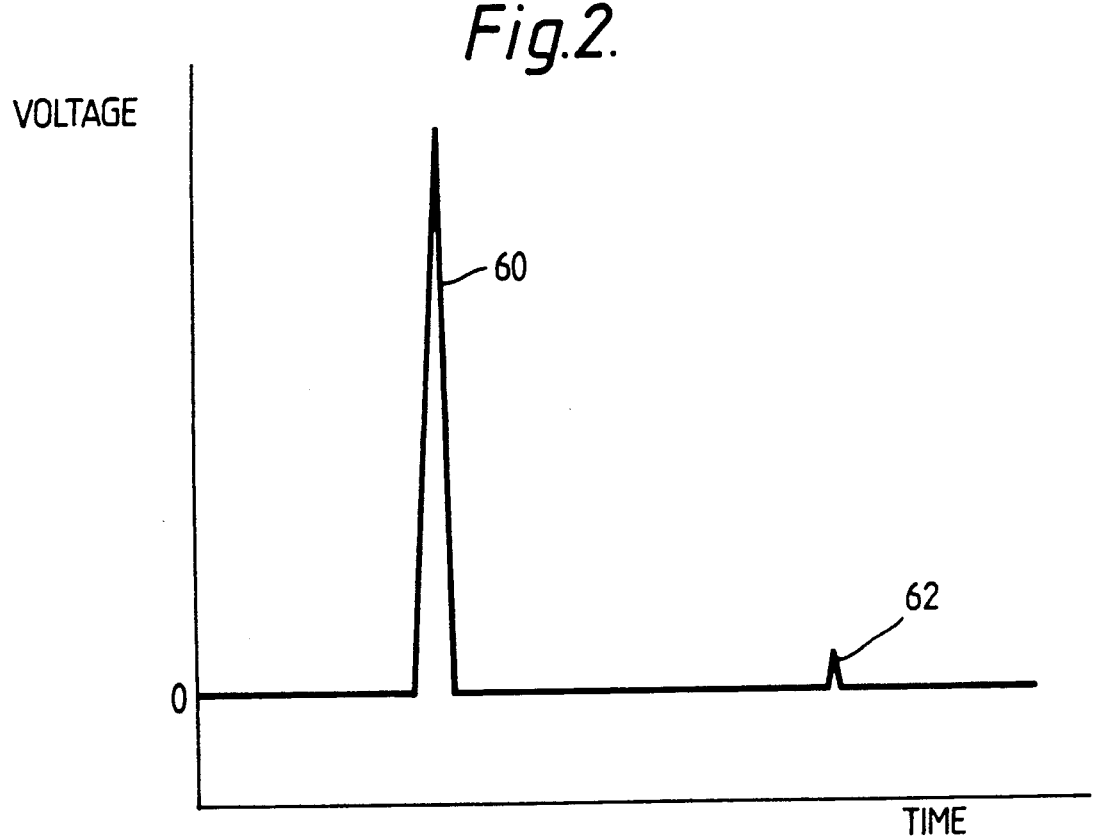
FIG. 2 is a graph of voltage against time showing first and second electrical pulses supplied to the stress wave sensor.
Figure 3:
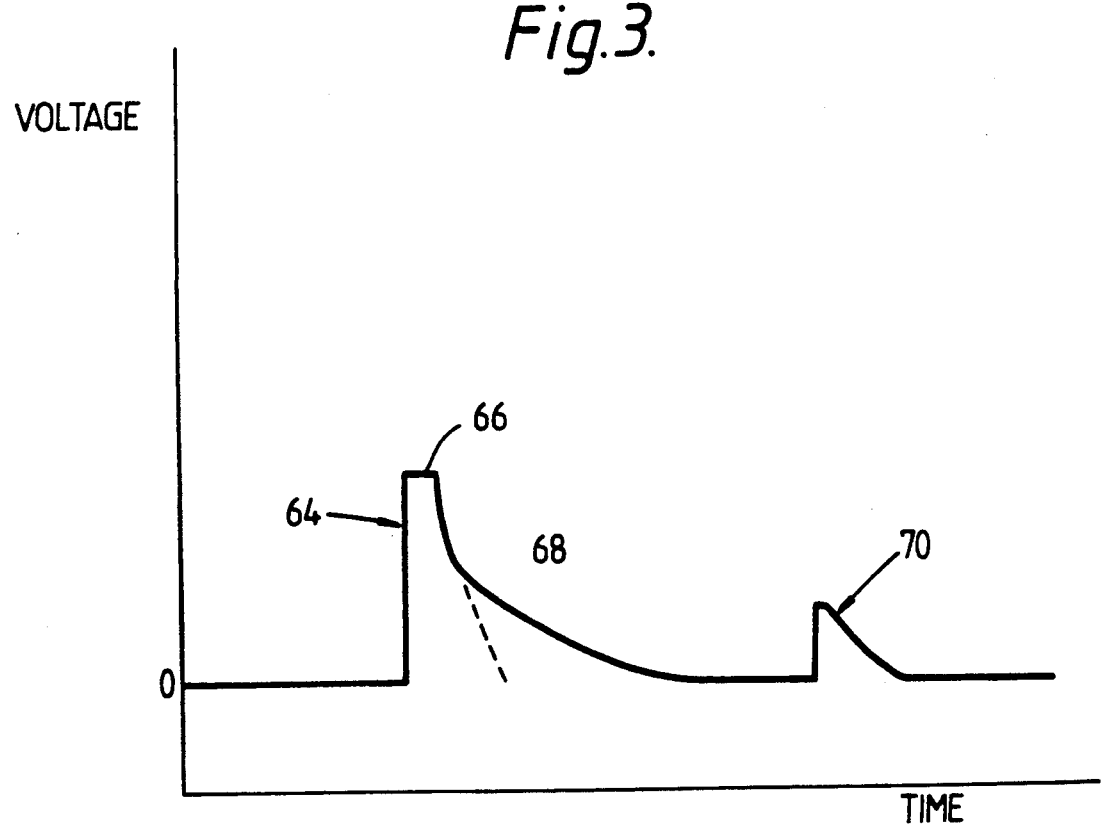
FIG. 3 is a graph of voltage against time showing the output envelope from an operative stress wave sensor as a result of the first and second electrical pulses.
Figure 4:
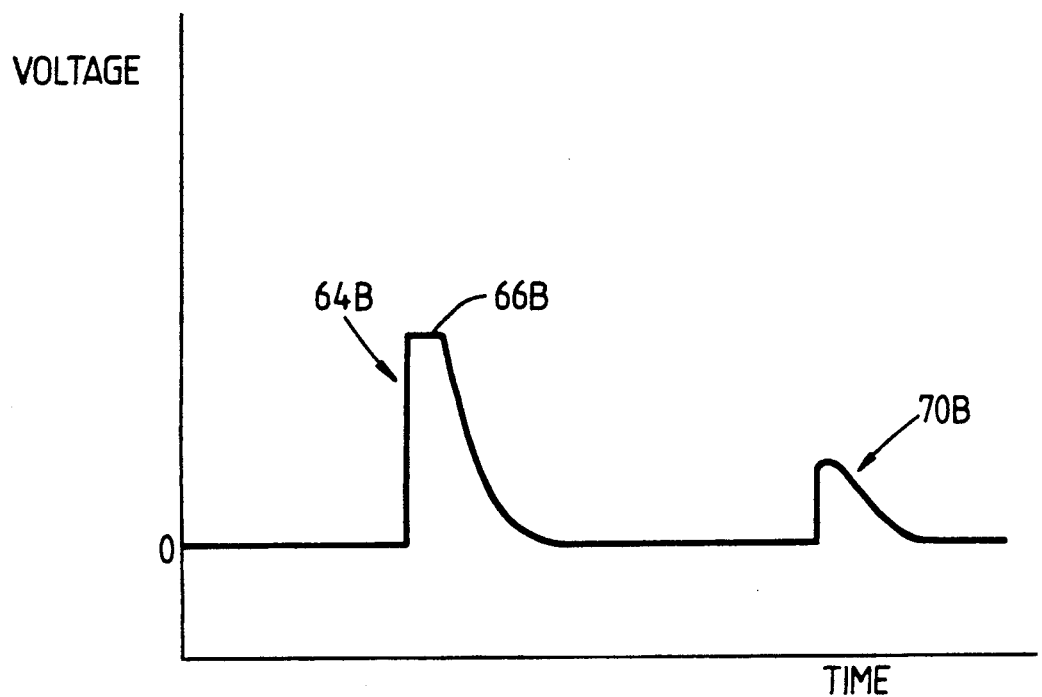
FIG. 4 is a graph of voltage against time showing the output envelope from one type of inoperative stress wave sensor as result of the first and second electrical pulses.

It is possible to detect from the first electrical pulse that the transducer 12 is still operative and that the amplifier is still operative, and that there has been no change in the overall stress wave sensor operation. Referring to FIGS. 2, 3 and 4 as a result of the first electrical pulse 60 and second electrical pulse 62 there are envelope signals 64 and 70 from the amplifier 20 after rectification and enveloping by the processor.

In FIG. 3 the response for an operative stress wave sensor 10 is shown, the output envelope signal 64 comprises a first portion 66 and a second portion 68. The first portion 66 corresponds to the first electrical pulse received directly by the amplifier 20, and this portion has been clipped. The second portion 68 corresponds to the additional electrical signal generated by the excitation of the transducer 12 by the first electrical signal 60. The area under the second portion 68 gives a measure of the sensitivity of the transducer 12. As a result of the second electrical pulse 62 there is an output envelope signal 70 from the amplifier 20 after rectification and enveloping by the processor. The second electrical pulse 62 is of predetermined amplitude such that it is possible to determine the gain of the amplifier 12, by measuring the peak of output envelope signal 70. It is therefore possible to detect from the second electrical pulse the gain of the amplifier, and as a result of knowing the gain of the amplifier it is then possible to determine any change in the sensitivity of the transducer i.e. the portion 68 is dependent upon the transducer sensitivity and also upon the gain of the amplifier. For example a reduction in the portion 68 may result from a reduction in transducer sensitivity, a reduction in amplifier gain or a combination of the two. The overall response of the stress wave sensor 10 is proportional to the gain of the amplifier and the square of the transducer sensitivity. The second electrical pulse is therefor important in enabling the correction of the stress wave sensor operation, for example by adjusting the gain of the amplifier or adjusting the transducer.

In FIG. 4 a response is shown for a stress wave sensor in which the transducer is inoperative. The output signal 64B comprises a first portion 66B only, which corresponds to the first electrical pulse received directly by the amplifier 20. The amplifier 20 does not receive an additional electrical signal because the transducer is inoperative. The output signal magnitude 70B indicates the gain of the amplifier 20. This indicates that the transducer may need replacing because there is no additional electrical signal from the transducer.

Figure 5:
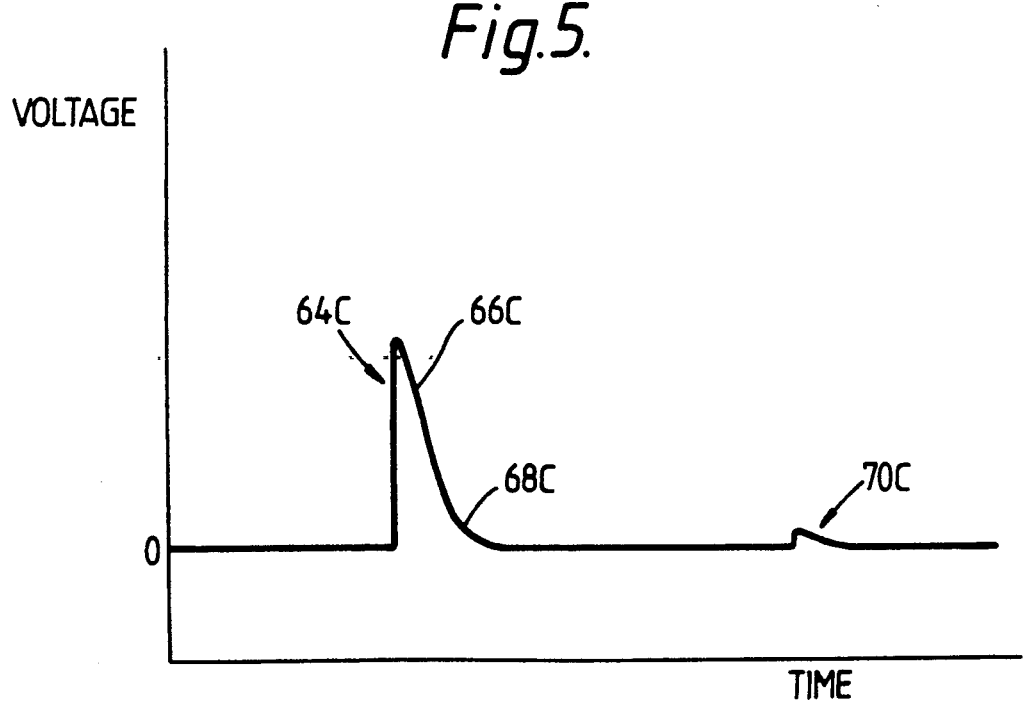
FIG. 5 is a graph of voltage against time showing the output envelope, from a further type of inoperative stress wave sensor as a result of the first and second electrical pulses.

In FIG. 5 a response is shown for a stress wave sensor in which the amplifier has reduced gain. The output signal 64C comprises a first portion 66C which corresponds to the first electrical pulse and a second portion 68C which corresponds to the electrical pulse from the transducer. However the first portion 66C is not clipped in this example because the gain is very small, and in consequence the second portion 68C is difficult to detect from the decay of the first portion 66C. The output signal 70C corresponds to the second electrical pulse, and this is of very small peak amplitude which indicates the gain of the amplifier is relatively small.

Figure 6:
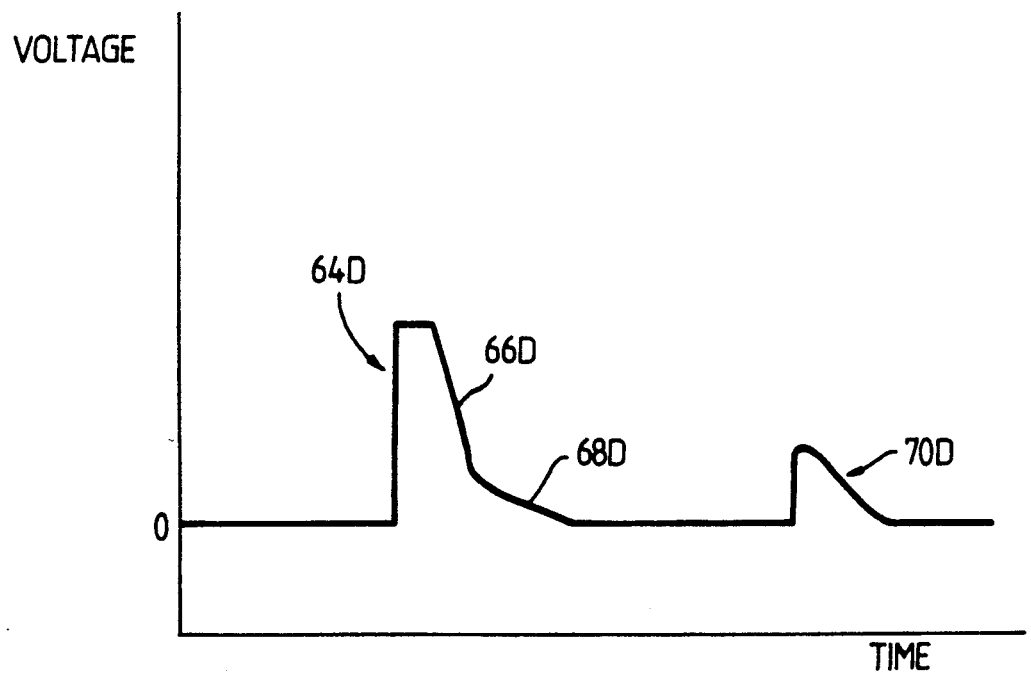
FIG. 6 is a graph of voltage against time showing the output envelope from a further type of inoperative stress wave sensor as a result of the first and second electrical pulses.

In FIG. 6 a response is shown for a stress wave sensor in which the transducer has reduced sensitivity. The output signal 64D comprises a first portion 66D which corresponds to the first electrical pulse and a second portion 68D which corresponds to the electrical pulse from the transducer. The first portion 66D is clipped, because the gain of the amplifier is large, but the area under the second portion 68D is very small which points towards a reduction in the transducer sensitivity. The output signal 70D corresponds to the second electrical signal of predetermined amplitude, and this is an acceptable range of peak amplitude, and indicates that the gain of the amplifier is satisfactory and thus that the amplifier is operating satisfactorily. In view of the output signal 70D it can be confirmed that the transducer sensitivity has reduced.

The pulser circuit 24 provides a testing feature for stress wave sensors which is of relatively low cost and which does not require an operator, and enables long term unattended monitoring of machinery or processes in which it can be confirmed that the stress wave sensor is working satisfactorily.

A pulser circuit may be arranged to supply the first and second electrical pulses in any order to the stress wave sensor, and more than one electrical pulse and second electrical pulse may be supplied to the stress wave sensor. The pulser circuit may be arranged to automatically conduct the testing of the stress wave sensor when the detected intensity, or level, in the monitoring mode of the stress wave sensor falls below a predetermined intensity or level.

We claim:

1. A method of testing the response of a stress wave sensor, the stress wave sensor comprising a transducer and an amplifier arranged electrically in series, the method comprising supplying to the sensor at a point electrically between the transducer and the amplifier at least one first electrical pulse having a relatively large amplitude such that it causes an operative transducer to oscillate, an operative transducer caused to oscillate by the at least one electrical pulse generating an additional electrical pulse, supplying the first electrical pulse and any additional electrical pulse generated by the transducer to the amplifier, an operative amplifier amplifying the first electrical pulse and any additional electrical pulse to produce an output signal, determining from the output signal of the amplifier if any one or more of the transducer and amplifier are not operating satisfactorily, an inoperative amplifier not amplifying the first electrical pulse and any additional electrical pulse and not producing an output signal, the lack of an output signal from the amplifier indicating that the amplifier is inoperative, supplying to the sensor at the point electrically between the transducer and the amplifier a second electrical pulse having a relatively small predetermined amplitude such that it does not saturate the amplifier, supplying the second electrical pulse to the amplifier, and determining from the output signal of the amplifier corresponding to the second electrical pulse the gain of the amplifier.

2. A method of testing the response of a stress wave sensor as claimed in claim 1 in which the gain of the amplifier is adjusted when the output signal of the amplifier corresponding to the second electrical pulse indicates the gain of the amplifier is less than a predetermined value.

3. A method of testing the response of a stress wave sensor as claimed in claim 1 in which the gain of the amplifier is adjusted when the output signal of the amplifier corresponding to the first electrical pulse indicates the sensitivity of the transducer has reduced.

4. A method of testing the response of a stress wave sensor as claimed in claim 1 in which the output signals are enveloped.

5. A method of testing the response of a stress wave sensor as claimed in claim 4 in which the peak amplitude of the enveloped output signal of the amplifier corresponding to the second electrical pulse is measured.

6. A method of testing the response of a stress wave sensor as claimed in claim 4 in which the area under the enveloped output signal of the amplifier corresponding to the additional electrical pulse is measured.

7. An apparatus for testing the response of a stress wave sensor, the stress wave sensor comprising a transducer and an amplifier arranged electrically in series, the apparatus comprising a pulser arranged to be electrically connected to the stress wave sensor at a point electrically between the transducer and the amplifier, the pulser is arranged to supply at least one first electrical pulse of relatively large amplitude such that it causes an operative transducer to oscillate, an operative transducer caused to oscillate by the at least one electrical pulse generates an additional electrical pulse, the first electrical pulse and any additional electrical pulse generated by the transducer are supplied to the amplifier, an operative amplifier amplifies the first electrical pulse and any additional electrical pulse to produce an output signal, means to determine from the output signal of the amplifier if any one or more of the transducer and amplifier are not operating satisfactorily, an inoperative amplifier not amplifying the first electrical pulse and any additional electrical pulse and not producing an output signal, the lack of an output signal from the amplifier indicating that the amplifier is inoperative, the pulser is arranged to supply at least one second electrical pulse of relatively small predetermined amplitude such that it does not saturate the amplifier, the second electrical pulse is supplied to the amplifier, means to determine from the output signal of the amplifier corresponding to the second electrical pulse the gain of the amplifier.

8. An apparatus as claimed in claim 7 in which a means to adjust the gain of the amplifier is arranged to increase the gain of the amplifier when the means to determine the gain of the amplifier from the output signal of the amplifier corresponding to the second electrical pulse indicates the gain of the amplifier is less than a predetermined value.

9. An apparatus as claimed in claim 8 in which the means to adjust the gain of the amplifier is arranged to increase the gain of the amplifier when the means to determine if any one or more of the transducer and amplifier indicates the sensitivity of the transducer has reduced.

10. An apparatus as claimed in claim 7 in which a processor envelopes the output signals.

11. An apparatus as claimed in claim 10 in which the processor measures the peak amplitude of the enveloped output signal of the amplifier corresponding to the second electrical pulse.

12. An apparatus as claimed in claim 10 in which the processor measures the area under the enveloped output signal of the amplifier corresponding to the additional electrical pulse.

13. An apparatus as claimed in claim 7 in which the pulser comprises a square wave generator arranged to supply a square wave signal to a first transistor, the first transistor being switched on when the input square wave is relatively high, the first transistor being electrically connected to a supply voltage, the first transistor being electrically connected in series to a second transistor via a capacitor, the second transistor being electrically connected to the supply voltage, the second transistor being switched on when the first transistor is switched on to produce the first electrical pulse, the first electrical pulse being supplied from the second transistor to the stress wave sensor, the capacitor being charged up to switch off the second transistor.

14. An apparatus as claimed in claim 13 in which the first transistor is switched off when the input square wave is relatively low, the first transistor producing the second electrical pulse which is supplied to the stress wave sensor via a second capacitor, a diode being arranged to set the predetermined amplitude of the second electrical pulse.

* * * * *